United States Patent [19]

Stith, Jr.

[11] 4,173,329
[45] Nov. 6, 1979

[54] JACK FOR POSITIONING AND SUPPORTING A MACHINE

[76] Inventor: Morris R. Stith, Jr., R.R. #1, Box 13, Webster, Ky. 40176

[21] Appl. No.: 901,287

[22] Filed: May 1, 1978

Related U.S. Application Data

[62] Division of Ser. No. 725,374, Sep. 22, 1976, Pat. No. 4,100,714.

[51] Int. Cl.² ............................................. B66F 3/24
[52] U.S. Cl. ................................................. 254/93 R
[58] Field of Search ............. 254/93 R, 93 H, 133 R; 52/79.13, 79.11, 122, 126, 741, 743, 744, 745; 248/19, 23; 29/407, 460

[56] References Cited

U.S. PATENT DOCUMENTS

| | | | |
|---|---|---|---|
| 2,215,146 | 9/1940 | Compano | 254/133 R |
| 2,503,659 | 4/1950 | Curtis | 254/93R |
| 2,886,875 | 5/1959 | Anderson | 254/93 R |
| 3,194,853 | 7/1965 | Weise et al. | 52/744 |

*Primary Examiner*—Robert C. Watson
*Attorney, Agent, or Firm*—Koenig, Senniger, Powers and Leavitt

[57] ABSTRACT

A jack for positioning and supporting a large industrial machine or other object on its foundation. The jack comprises a base to be supported on the foundation, a support member having a cylinder bore therein, and a ball mounted on the base, the lower end of the piston bearing on the ball to permit limited swivel movement. The support member has a generally flat, upwardly facing end face to engage the object from below and a lower downwardly facing end face which is supported by hardened grout and which extends out beyond the base. The support member is tapered from its lower to its upper end face providing a tapered surface which is sufficiently rough to mechanically interlock with the hardened grout thereby to inhibit upward movement of the support member with respect to the foundation.

4 Claims, 6 Drawing Figures

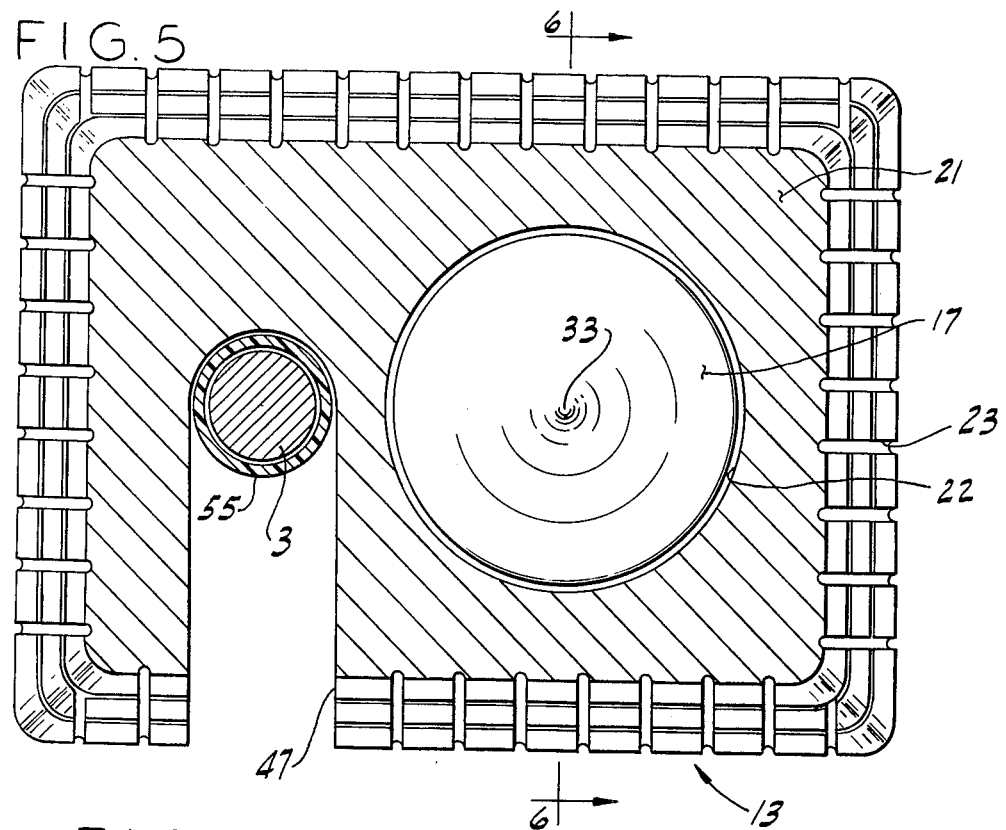
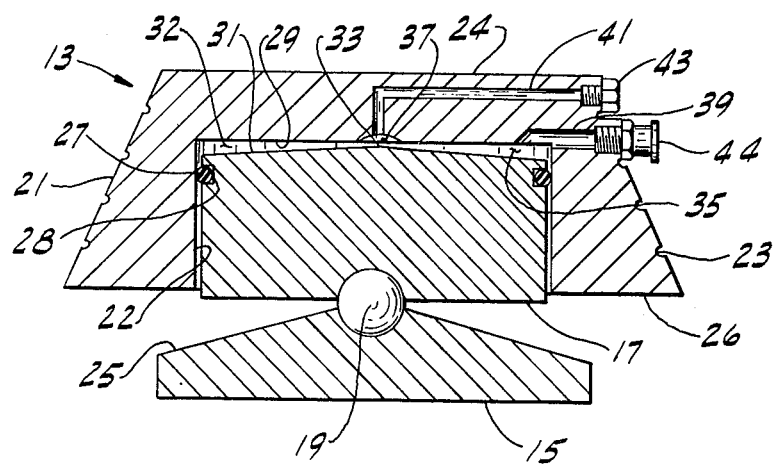

JACK FOR POSITIONING AND SUPPORTING A MACHINE

CROSS-REFERENCE TO RELATED APPLICATION

This is a division of application, Ser. No. 725,374, filed Sept. 22, 1976 now U.S. Pat. No. 4,100,714.

BACKGROUND OF THE INVENTION

This invention relates to a jack for positioning and supporting an object, such as heavy mechanical equipment or a large stationary machine.

Large stationary machines, such as air compressors, components of a rolling mill, or other industrial equipment, must be rigidly secured to their foundations and in many instances must be accurately positioned relative to other equipment. Typically, these large machines are mounted on reinforced concrete foundations and are accurately positioned thereon by means of jack screws or the like. With the machine supported in its desired position, precision-machined shims or chocks are installed between the support points or pads of the machine and the foundation so that the machine is accurately positioned and supported in its selected position. These precision-machined shims are costly and time consuming to manufacture and install. With the machine supported on the shims, a grouting mix, such as an aggregate-containing epoxy resin or the like, is poured around the shims. After the grouting mix has hardened, anchor bolts are tightened to secure the machine to the foundation and prevent any upward or lateral movement.

Typically, machinery which is mounted in the above-described manner operates continuously and is subject to vibrational and other cyclic loading. Over a period of time, this loading may cause the grouting to degrade and deteriorate so that the machine must be periodically reset on its foundation. With conventional machine mounting system, the machine must be removed from its foundation and the grouting mix chipped away. The machine is then repositioned, reshimmed, regrouted and rebolted to the foundation. This resetting procedure is costly and frequently entails several weeks' time during which the machine is out of operation or "down". This may require shutdown of an entire plant or a product line with consequent great loss of revenue.

Adjustable machine supports, such as shown in U.S. Pat. No. 3,695,352, are known which use steel balls within a piston and cylinder arrangement to support a machine. However, these adjustable machine supports, particularly where access to the support is limited, may be difficult to adjust for accurate positioning of the machine. Also, systems, such as shown in U.S. Pat. No. 3,194,853, are known in which an epoxy resin is injected into voids in the grouting beneath a machine base to fill the voids.

As shown in my U.S. Pat. Nos. 3,978,574 and 4,046,354, a method of and apparatus for positioning and supporting a machine are disclosed in which the machine is raised to a selected level by a series of hydraulic jacking units pressurized with a hardenable hydraulic working fluid (e.g., epoxy resin) and then sealed once the machine is moved to its selected position. The hardenable fluid within the jacking units is permitted to harden thereby to internally fix the jacking units in their adjusted positions. After the jacking units have been fixed, grout is poured around them. However, since the epoxy resin inside the jacking units hardens substantially without expansion or contraction, the grout surrounding the jacking units merely holds the jacking units in position and does not bear any substantial portion of the weight of the machine or the cyclical or vibrational loading of the machine. In the event these jacking units must be reset, the grout surrounding the units must be removed and the machine reset on new jacking units.

SUMMARY OF THE INVENTION

Among the several objects of this invention may be noted the provision of a jack for setting or resetting a heavy machine or the like on its foundation in which a plurality of support points of the machine supported by the jacks may be readily and accurately adjusted so as to precisely position the machine in a desired position; the provision of such a jack which does not require that the machine be removed from its foundation for resetting of the machine; the provision of such a jack which may be used in solidly supporting the machine in its desired position; the provision of such a jack which enables a machine set in accordance with this method to be subsequently reset without removing the jacking units; and the provision of such a jack which substantially reduces the cost and the down-time required to mount or to reset a machine.

Briefly, a jack of this invention which positions and supports an object, such as a large machine, on a foundation and which is surrounded by and embedded in hardenable grout after the object has been properly positioned with one portion of the jack engaging the object and supporting it on the grout after hardening of the grout comprises a base adapted to be supported on the foundation, a support member having a blind bore therein constituting a cylinder, a piston slidably received in the cylinder, and a ball mounted on the base, the lower end of the piston bearing on the ball to permit limited swivel movement of the piston and support member relative to the base. The portion of the cylinder between the upper end of the piston and the cylinder end wall constitutes an expansible chamber adapted to receive a pressurized hydraulic working fluid for effecting upward movement of the support member away from the base. The support member has a pair of opposed end faces, one face being generally flat and constituting an upper end face for engaging said object from below and the other face constituting a lower end face extending out beyond the base and adapted to be supported by the hardened grout. The support member is tapered from its lower to its upper end face providing a tapered surface convergent from its lower to its upper end face, said surface being sufficiently rough to mechanically interlock with the hardened grout thereby to inhibit upward movement of the support member with respect to the foundation. Other objects and features will be in part apparent and in part pointed out hereinafter.

BRIEF DESCRIPTION OF THE DRAWINGS

FIG. 5 is a plan view of a jacking unit with a portion of its support member broken away to illustrate a cylinder and piston therein; and FIG. 6 is a vertical section of the jacking unit taken along line 6—6 of FIG. 5.

Corresponding reference characters indicate corresponding parts throughout the several views of the drawings.

DESCRIPTION OF PREFERRED EMBODIMENTS

Figure 1:
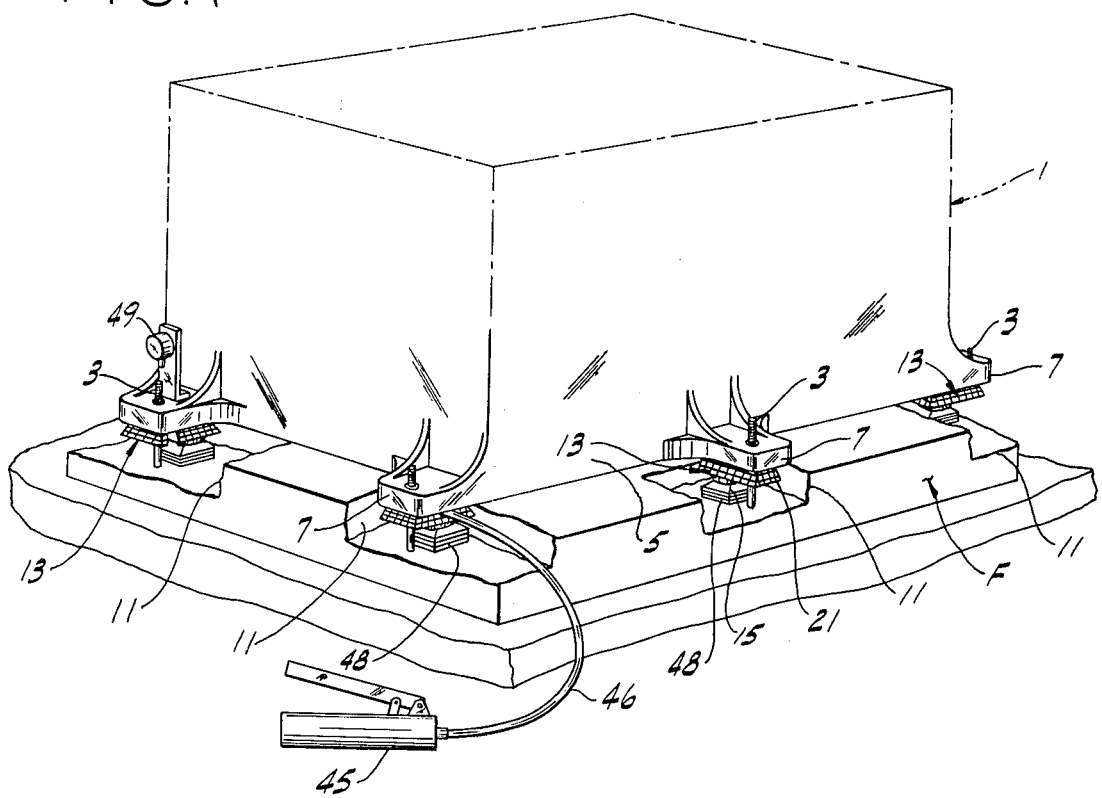
FIG. 1 is a perspective view of an object or a machine which is to be accurately positioned on its foundation by the use of jacks of the present invention.

Referring now to the drawings, and more particularly to FIG. 1, a heavy object 1, such as a large piece of stationary mechanical equipment, a machine, or the like, is shown resting on its foundation F. For example, object 1 may be a large industrial air compressor rated at 6000 horsepower or more and weighing 50 to 100 tons. Typically, these machines are secured to their foundations by a plurality (e.g., six are shown in FIG. 1) of anchor bolts 3 securely embedded in foundation F. The latter may be a large monolithic mass of reinforced concrete weighing several times as much as the machine to be mounted thereon. As shown, the air compressor has a base 5 including support points or pads constituted by mounting flanges or feet 7 having bolt holes 9 therethrough for reception of respective anchor bolts 3. These mounting flanges are rigidly secured to the machine (e.g., they may be integrally cast with the machine frame). In mounting a large stationary machine, it is usually essential that it be precisely positioned and leveled. For example, the rolls of a rolling mill or the like must often be positioned and leveled to be within 0.001 in. (0.025 mm.) of a desired position. For other machinery, such as an air compressor, it need not only be as accurately positioned, but it is essential that it be so supported on its base that its crankshaft is free of deflection. This may require trial and error adjustment of the mounting flanges 7 of the machine until the deflection of the crankshaft axis is eliminated.

Figure 2:
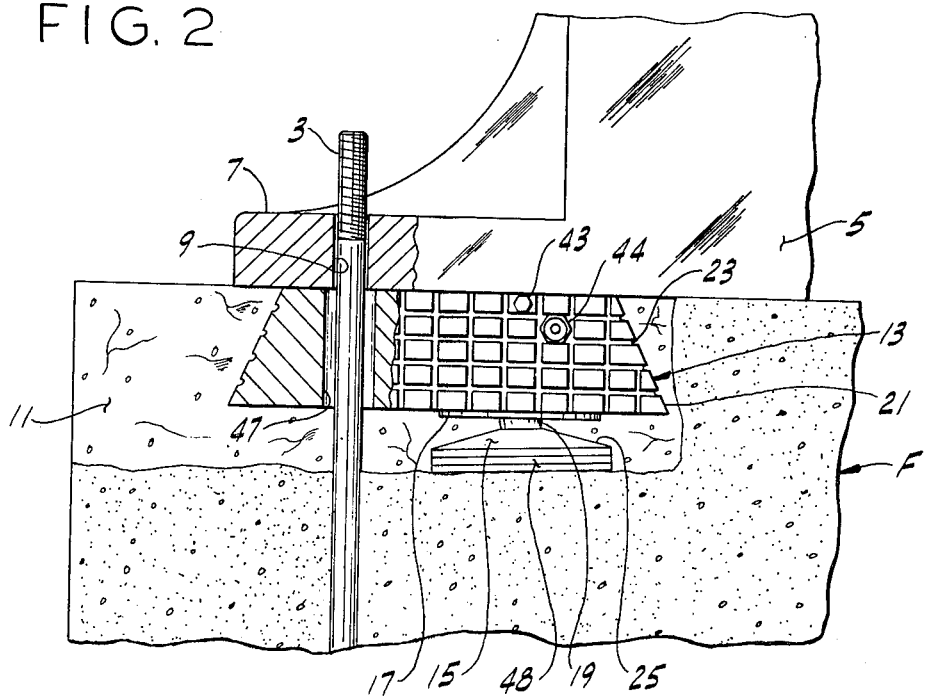
FIG. 2 illustrates a pocket or recess formed in the foundation below a mounting flange on the object with a hydraulic jacking unit of this invention installed in a recess in the foundation, with parts of the jacking unit broken away.

This involves accurately positioning and supporting object or machine 1 on its foundation F. The method described below is for resetting objects previously mounted in a conventional manner which must be repositioned and remounted. However, it will be understood that the jacks of this invention may also be used to initially position an object on its foundation. In accordance with this method, anchor bolts 3 are first unbolted to free the machine from its foundation F. As shown in FIG. 1, pockets or recesses 11 are formed in foundation F immediately below each mounting flange 6 of the machine. For previously installed machines, these recesses may be formed by jack-hammering away a portion of the foundation. For new installations, the concrete foundation may be poured with the recesses formed therein. Anchor bolts 3 extend up through these recesses. It will be understood that, when recesses 11 are formed, the anchor bolts remain solidly embedded in the foundation. It will also be noted that with recesses 11 formed adjacent mounting flanges 7, base 5 of the machine is still supported on the foundation (see FIG. 2) intermediate the recesses thereby making it unnecessary to lift or remove the machine from the foundation for resetting purposes.

A hydraulic jacking unit of this invention, as generally indicated at 13 (e.g., a hydraulically adjustable sole plate), is positioned in each recess 11 below a respective mounting flange 7. The bottom of recess 11 is cleared of loose concrete or other debris and is made relatively flat so as to provide a solid support for the jacking unit.

Referring now to FIG. 6, each jacking unit 13 is shown to comprise a base plate 15 which rests on the bottom of recess 11. The lower end of a stationary piston 17 bears against a ball 19 mounted on the base plate 15 to permit limited swiveling movement of the piston relative to the base plate about any axis. The jacking unit further includes a support member or cylinder block 21 having a blind bore therein constituting a cylinder 22 for reception of piston 17. The cylinder block is preferably of cast iron or the like and it is shown to have a rough surface 23 so as to mechanically interlock with grouting material poured therearound in a manner as will appear. As indicated at 24, the upper face of cylinder block 21 is machined flat so as to insure uniform contact with mounting flanges 7 of machine 1. The upper face 25 of base plate 15 slopes downwardly away from ball 19 to provide sufficient clearance between the bottom of piston 17 and the base plate for purposes as will appear. The lower face 26 of the cylinder block constitutes a downwardly facing surface as shown best in FIGS. 5 and 6, cylinder block 21 is tapered from its lower face 26 to its upper face 24, surface 23 thus being a tapered surface, and the corners of the cylinder block are rounded.

Ball swivel 19 permits piston 17 and cylinder block 21 to be self-aligning with respect to base plate 15 so as to enable upper cylinder block surface 24 to uniformly engage the bottom of mounting flange 7 with the base plate resting on the bottom of recess 11. Piston 17 has an O-ring seal 27 received in a circumferential groove 28 around its outer end, the seal providing a sliding, sealing fit between the walls of cylinder 22 and the piston. Cylinder 22 has an end wall or face 29 and piston 17 has an upper end face 31, these faces being opposed to one another. The portion of cylinder 22 between piston face 31 and cylinder face 29 forms an expansible chamber 32 for purposes as will appear. Piston end face 31 protrudes out beyond the end of the piston with the outermost portion of the piston face, as indicated at 33, being at the center thereof. Specifically, a piston and cylinder faces 31 and 29, respectively, are movable relative to one another between a retracted position in which the faces are closely spaced relative to one another and an extended position. With the piston and cylinder faces in their stated retracted positions, an annular space 35 surrounds the outermost portion 33 of piston face 31. Cylinder face 29 has a pocket recess 37 therein at the center thereof. Cylinder 22 has an inlet port 39 adjacent cylinder face 29 for the introduction of a liquid, such as a nonhardenable liquid epoxy resin or the like, constituting a hydraulic working fluid into chamber 32 for pressurizing cylinder face 29 and piston face 31 so as to effect upward movement of the piston 17 and cylinder block 21 relative to the base plate 15. Cylinder 22 also has an outlet port 41 in communication with pocket 37 for exit of air from chamber 32 as the hydraulic working fluid enters this chamber. Outlet port 41 is internally threaded for receiving a plug 43 to close the outlet port once air has been expelled from within chamber 32. A one-way valve fitting 44, such as a button-type high-pressure grease fitting with a ball-check valve incorporated therein, is installed in inlet port 39 so as to permit flow of liquid into chamber 32 and and to prevent exit of the liquid therefrom. As shown in FIG. 1, hydraulic jacking unit 13 may be pressurized by a piston-type hand pump 45 or other suitable pump having a flexible pressure hose 46 adapted to be snapped onto fitting 44 thereby to permit the flow of fluid into the jacking unit. Upon discontinuing pumping of pump 45, the fitting automatically closes and seals the jacking unit, entrapping the hydraulic fluid within the unit. As indicated at 47 in FIG. 5, cylinder block 21 has a relatively deep elongate notch therein extending from its upper to its lower end face generally parallel to the longitudinal axis of the cylinder 22. BOH 3 is received in this notch 47 thereby to insure that the jacking unit is held captive to and properly positioned with respect to the anchor bolt and to mounting flanges 7.

Figure 3:
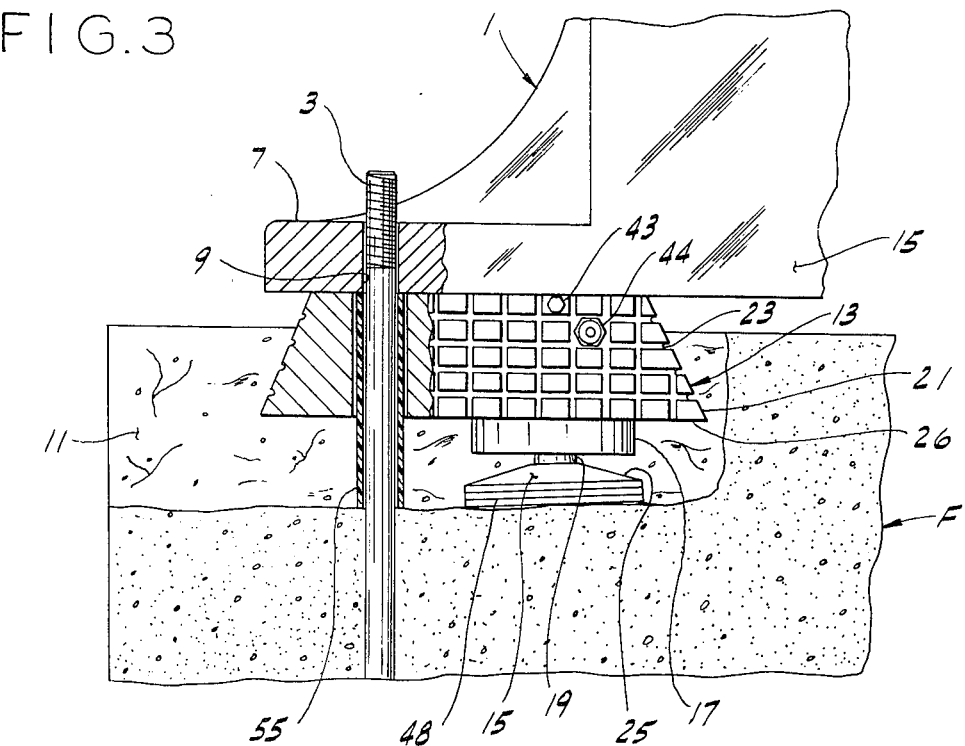
FIG. 3 is a view similar to FIG. 2, showing the jacking unit pressurized to lift the machine clear of the foundation, the distance the machine is lifted clear of the foundation being exaggerated for purposes of illustration.

With jacking units 13 in place in recesses 11, shims 48 may optionally be placed between base plate 15 and the bottom of the recess so as to bring the top surface 24 of the cylinder block 21 into contact with the bottom surface of a respective machine mounting flange 7. With all of the jacking units in place, a conventional hydraulic fluid is introduced into each jacking unit under pressure via its inlet port 49 and fitting 44 thereby to fill chamber 32 with liquid and to force all air within the chamber out of outlet 41. Pocket recess 37 formed in cylinder face 29 and the outwardly protruding piston end face 31 insure that liquid entering chamber 32 completely fills the chamber without forming voids therein and that all the air is exhausted from the chamber via outlet 41. When liquid flows out of outlet 41, the outlet port is capped by plug 43. The jacking unit is then pressurized by introducing more hydraulic fluid into the chamber so as to effect relative movement of piston 17 and cylinder block 21 to lift machine 1 clear of its foundation F (see FIG. 3). As previously mentioned, when pumping of pump 45 is discontinued, fitting 44 automatically closes to entrap hydraulic fluid in the chamber and to maintain it under pressure so as to support the machine in a desired or selected elevation or position. By selectively pressurizing each of the jacking units 13 by means of hand pump 45, the entire machine may be lifted clear of foundation F and clear of any previously poured grouting material thereon. For example, the machine may be initially lifted 0.060–0.075 in. (1.5–1.9 mm.) in order to insure complete separation of the machine from the foundation. By requiring that the machine need be lifted only a relatively small distance, piping previously connected to machine 1 need not be disconnected and repositioned, thus saving considerable time in remounting a machine.

Typically, the selected position for the machine is above its above-described initial lifted position in which the machine is clear of foundation F. To position the machine in its selected position, jacking units 3 at the center of the machine are first pressurized to lift the center of the machine to its selected position and the outer units are then appropriately pressurized. The selected position may be established by dial indicators 49 (see FIG. 1) attached to the frame of the machine which register the displacement of the machine relative to foundation F or to another stationary reference. For example, the desired location of the machine may be established by determining the distance each of the mounting flanges 7 must be elevated from its initial raised position so as to position a reference point on the machine at a desired level. Means other than dial indicators may, of course, be used to precisely locate and align machine 1. For example, targets may be placed on the machine and optical transits or other measuring instruments may be utilized to align these targets with a desired reference.

It will be understood that during positioning of the machine precise adjustment of each of the jacking units 13 is usually required. For example, a typical cylinder 22 in a jacking unit 13 may have a diameter of 5.000 in. (127 mm.), and hand pump 45 may be a conventional high-pressure (1500 psi) hydraulic pump. For each full stroke of the hand pump, cylinder block 21 is moved 0.0005 in. (0.013 mm.). Thus, each of the jacking units may be precisely adjusted merely by stroking the hand pump. Upon obtaining a selected position for a jacking unit, hose 46 is removed from fitting 44 and the hydraulic fluid will remain entrapped within chamber 32. The jacking units may be lowered by loosening plug 43 and allowing a quantity of the hydraulic fluid to be vented from cylinder 22. Because of the ease with which each of the jacking units may be adjusted to support the machine in its selected position, the method of this invention enables much more rapid and easy positioning of the machine. It will be understood that, for other jobs in which the object 1 is to be repositioned is heavier or lighter, the diameter of piston 17 and cylinder 22 may be varied in accordance with the load each jacking unit 13 is required to support. Thus, the effective pressure area of the jacking units may be varied so as to increase the load it can lift while maintaining its working pressures within desired limits. With machine 1 positioned in its selected position and with each of the jacking unit 13 maintained in its respective adjusted position (i.e., by closing the inlets and outlets to the jacking unit thereby to prevent the escape or leakage of hydraulic fluid from therewithin), each of the jacking unit is then permanently and positively fixed in its adjusted position so as to fix the machine in its selected position. More particularly, the jacking units are fixed in their adjusted positions by pouring a hardenable material or grout G (see FIG. 4) into recesses 11 in foundation F so that the grout surrounds the jacking units. In this connection, the fact that the upper surface 25 of the base 15 of each jacking unit is sloped downwardly from ball 19 ensures that there is a sufficient space between the base and the lower face 26 of cylinder block 21 and piston 17 to permit grout to flow therebetween. After hardening, the grout bears against the lower face 26 of the cylinder block and supports the weight of the machine. The grout also fixes the piston in position relative to the base and prevents relative movement between the piston and the base. As previously mentioned, the tapered surface 23 of cylinder block 21, which surface is convergent from the lower face 26 to the upper face 24 of the cylinder block, is sufficiently rough so that it mechanically interlocks with grout G. This inhibits upward movement of the cylinder block with respect to the foundation F and firmly fixes the jacking unit in position.

It will be understood that any suitable grout material, such as an epoxy-resin-hardener blend containing an aggregate (e.g., fine white sand or the like), which hardens substantially without expanding or contracting, may be used. For example, one such epoxy grout is commercially available under the trade designation "Escoweld 7505" from the Enjay Chemical Company of Houston, Texas. This epoxy resin is a two-part mixture supplied in separate premeasured containers which when blended together may be mixed with a predetermined quantity of aggregate. Once mixed, the blended epoxy resin grouting material has a usable pot life between two and four hours, depending on the ambient temperature level. Upon pouring the grout into recesses 11 around jacking units 13, it will cure in approximately 72 hours at 77° F. (25° C.). The cure time of the grouting mixture may be appreciably reduced by elevating the temperature of the grout. For example, by covering the machine with a tarp or the like and introducing hot air or steam into the enclosed machine to elevate the temperature to 110° F. (43° C.), the cure time may be reduced to a few hours. This epoxy grouting material exhibits no substantial change in volume as it cures and thus will accurately maintain the jacking units in their adjusted positions. Of course, other types of epoxy and conventional cement grouts may be used.

Each jacking unit 13 is so sized that its cylinder block 21 has a bottom surface 26 of sufficient area to provide an adequate bearing surface for the grout thereby to insure that the grout is not subjected to excessive compressive loading which over a time could cause the grout to deteriorate. While fully cured epoxy and cement grouts may have maximum compressive strengths ranging between 4500–7000 psi or more, as determined by a generally recognized testing procedure (e.g., ASTM C-109), it is desirable that the surface area of the bottom 26 of the cylinder block be sufficient to limit the compressive static loading on the grout to 750 psi or less, thereby to insure a long service life for the grout as it is subjected to continuous cyclic and vibrational loading from operation of the machine supported thereby. Preferably, however, static compressive loading on the grout is limited to 150 psi or less.

Figure 4:
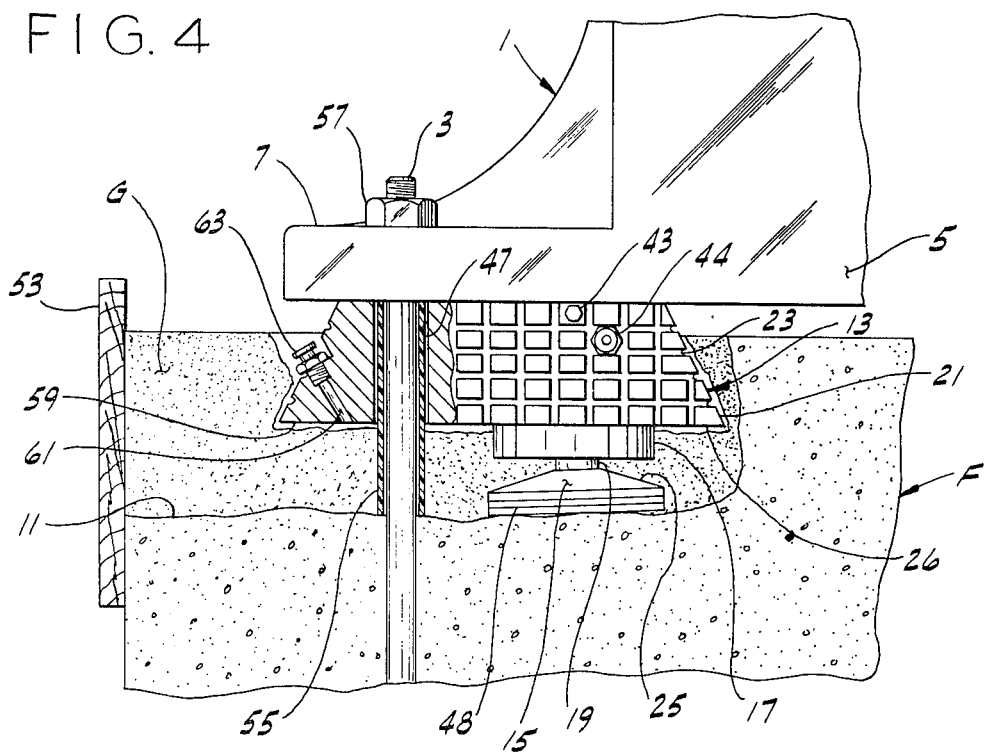
FIG. 4 is a view similar to FIG. 3, showing the object positioned in its selected position with the jacking unit fixed to support the object by hardenable grouting poured into the recess surrounding the jacking unit.

As shown in FIG. 4, a dam or form 53 is placed across the outer vertical openings of recesses 11 on the sides of foundation F prior to pouring grout G into the recesses so as to contain the grout within the recesses. Prior to pouring the grout into the recesses, it is preferred that the shank of each anchor bolt 3 be coated with a suitable release agent, such as paraffin wax, and that it be surrounded by a sleeve 55 of rubber tubing or the like to shield the anchor bolt from the grout thereby to prevent the latter from adhering thereto. After grout G which has been poured into the recesses and surrounding jacking units 13 has hardened, nuts 57 are threaded on anchor bolts 3 and tightened in a sequence, as may be specified by the manufacturer of the machine being mounted, to a predetermined preload level thereby to secure the machine on the foundation. Alternatively, nuts 57 may be threaded on bolts 3 prior to pouring grout G around the jacking units, but only a slight amount of preload is applied to the bolts prior to pouring the grout. After the grout fully cures, the nuts are tightened in the above-described manner until the anchor bolts are under the desired preload level. With these anchor bolts preloaded under a specified tension load, machine 1 is prevented from moving relative to the foundation. It will be understood that the grout G bearing against the lower surfaces 26 of cylinder blocks 21 bears the full weight of the machine and also carries the preload of the anchor bolts.

Further in accordance with this invention, it will be understood that subsequent to the hardening of grout G in the recesses so as to fix jacking unit 13 in place, plug 43 closing outlet port 41 may be opened thereby to relieve hydraulic pressure from within the jacking unit and to insure that all the load carried by the jacking unit is supported directly on the grout bearing against the bottom face 26 of cylinder block 21. Thus, the swivel ball 19 and base plate 15 of each of the jacking units is substantially free of load.

Still further in accordance with this method, after an extended period of use and in the event the jacking units work loose in grout G, machine 1 may be repositioned and again secured in its selected position by only repeating some of the previously described steps and by accomplishing an additional step as will appear. More generally, after a large air compressor or other machine has been secured to its foundation in accordance with this method for several years, the grout surrounding the jacking units 13 may deteriorate, as indicated at 59 in FIG. 4, and thus may fail to firmly fix the jacking units in position in the foundation. Such loose jacking units may permit the machine to vibrate excessively thus necessitating the resecurement of the machine to its foundation. This is a typical problem common to most conventional machine grouting systems.

With the method disclosed herein, the machine may be repositioned in a selected position by unbolting the machine from its foundation F and by attaching hand pump 45 to fittings 44 on each of the jacking units and introducing additional hydraulic fluid into the jacking units so as to again position the machine in a selected position in the manner heretofore described. With the machine again in its selected position, the jacking units are closed thus entrapping hydraulic fluid within the jacking units and thus maintaining the machine in its selected position.

This method further involves again fixing the jacking units in their selected positions relative to the foundation. Preferably this is accomplished by drilling a hole 61 (see FIG. 5) through the cylinder block 21 of each jacking unit to the bottom face 26 thereof and by threading an inlet fitting 63, similar to fitting 44, into this hole. Another hand pump (not shown, but similar to pump 45) is attached to this fitting and a hardenable liquid, such as a liquid epoxy resin mixed with a suitable conventional hardener, is pumped under pressure down hole 61 and expelled into the void 59 between cylinder block 21 and the previously formed grout G. Additional liquid is pumped into this void until excess liquid flows out the upper interface between the cylinder block and the previously formed grout. By introducing the hardenable liquid into the void from the bottom face of the cylinder block via hole 61, the hardenable liquid fills substantially all of the spaces of the void between the cylinder block and the old grout and substantially prevents the entrapment of air within the void. With the jacking units maintained in their selected position by the entrapped hydraulic fluid therewithin, the hardenable liquid introduced into the void will harden and thus securely fix the jacking units in their selected positions. The machine is then rebolted to the foundation in the manner heretofore described.

In view of the above, it will be seen that the several objects of the invention are achieved and other advantageous results attained.

As various changes could be made in the above methods without departing from the scope of the invention, it is intended that all matter contained in the above description or shown in the accompanying drawings shall be interpreted as illustrative and not in a limiting sense.

What is claimed is:

1. A jack for positioning and supporting a large, heavy object, such as a machine, on its foundation, said jack being adapted to be surrounded by and embedded in hardenable grout after the object has been properly positioned with one portion of the jack engaging the object and supporting it on the grout after hardening of the grout, said jack comprising a base adapted to be supported on the foundation, a support member having a blind bore therein constituting a cylinder, a piston slidably received in the cylinder, and a ball mounted on the base, the lower end of the piston bearing on the ball to permit limited swivel movement of the piston and support member relative to the base, the portion of the cylinder between the upper end of the piston and the cylinder end wall constituting an expansible chamber adapted to receive a pressurized hydraulic working fluid for effecting upward movement of the support member away from the base, the support member having a pair of opposed end faces, one face being generally flat and constituting an upper end face for engaging said object from below and the other face constituting a lower end face extending out beyond the base and adapted to be supported by the hardened grout, and the support member being tapered from its lower to its upper end face providing a tapered surface convergent from its lower to its upper end face, said surface being sufficiently rough to mechanically interlock with the hardened grout thereby to inhibit upward movement of the support member with respect to the foundation.

2. A jack as set forth in claim 1 wherein said base has a generally upwardly facing surface spaced sufficiently below the lower face of the support member so as to facilitate the flow of unhardened grout between the base and the lower face of the support member.

3. A jack as set forth in claim 2 wherein said upwardly facing surface of the base slopes downwardly from said ball.

4. A jack as set forth in claim 1 wherein said support member has an elongate notch therein extending from its upper to its lower end face generally parallel to the longitudinal axis of the cylinder for receiving therein an anchor bolt or the like which secures said object to the foundation.

* * * * *